B. LIEBOWITZ.
VEHICLE SUSPENSION.
APPLICATION FILED NOV. 2, 1914

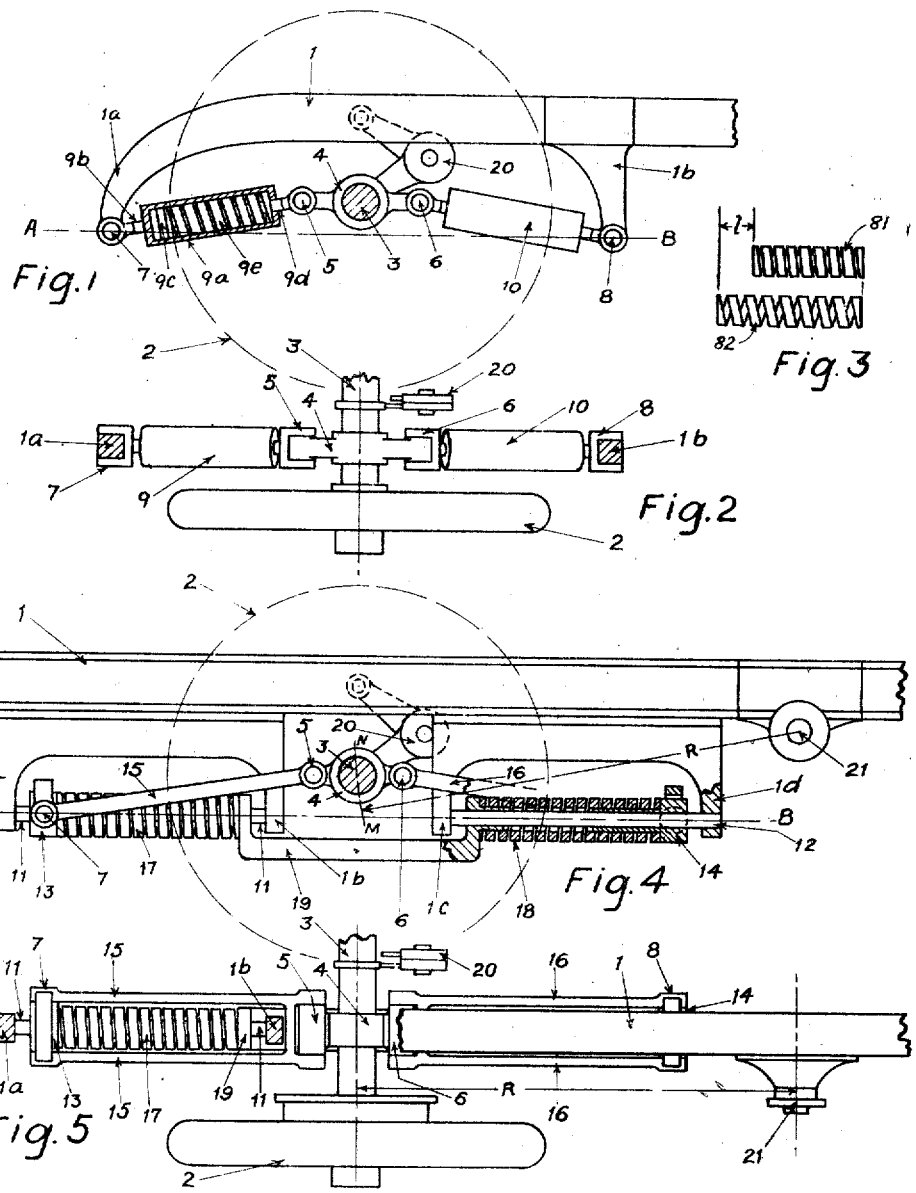

1,240,992.

Patented Sept. 25, 1917.
2 SHEETS—SHEET 2.

Witnesses:
Nicholas J. Meono
Grace M. Riviere

Benjamin Liebowitz, Inventor
By his Attorney

UNITED STATES PATENT OFFICE.

BENJAMIN LIEBOWITZ, OF NEW YORK, N. Y.

VEHICLE SUSPENSION.

1,240,992.

Specification of Letters Patent.　　Patented Sept. 25, 1917.

Application filed November 2, 1914. Serial No. 869,725.

*To all whom it may concern:*

Be it known that I, BENJAMIN LIEBOWITZ, a citizen of the United States, and a resident of the city of New York, in the county of New York and the State of New York, have invented certain new and useful Improvements in Vehicle Suspensions, of which the following is a specification.

My invention relates to the spring mounting interposed between the wheels of a vehicle and the body thereof, and is particularly applicable to motor-trucks, or other automobiles.

One of the most important defects in the vehicle springs now commonly in use is their comparatively short life and consequent unreliability due to fatigue, which, as is well known, is caused by the severe and oft repeated stresses to which they are subjected. As my experiments and observations have brought out, however, there is an even more important result of the fatigue phenomenon, and that is that severe and oft repeated stresses impair the elasticity of springs and cause them to ride "hard" long before they may break.

The objects of my invention are: to provide a spring suspension which will respond freely to the roads' irregularities with the imposition of minimum force on the body; to enable the suspension to maintain this freedom of response throughout its useful life, by minimizing or entirely eliminating fatigue and its effects; to increase the life of the suspension so that it will be as durable and reliable as the frame, for example; and to secure other advantages which will hereinafter be brought out. I accomplish these objects by means of a suspension in which the necessary elastic forces are obtained, not by merely altering the elastic configuration of the spring, but rather by altering the force components of an initially strained spring, with only incidental changes in its elastic configuration.

To illustrate what is meant, consider first an ordinary vehicle spring. If the spring has a stiffness of say 400 pounds per inch, and if a load of say 200 pounds is added, the spring will deflect one-half an inch. The load increase of 200 pounds is met, therefore, by a change in the configuration of the spring, i. e., by a deflection of one-half an inch. Consider, now, a violin string, for example. It is under considerable tension, but when at rest it exerts no force perpendicular to itself. Let the string be pulled a little to one side, however, and a force perpendicular to the original position of the string is introduced, not by an increase in the tension of the string, for the change in tension is negligibly small, but by the fact that the direction of the tension is changed so as to introduce a force component perpendicular to the original direction of the string. As long as the displacements are small, the forces thus introduced are proportional to the displacements and arise without any appreciable change in the tension of the string. Musical strings, therefore, offer a simple example of how elastic forces may be obtained by a change in direction of an almost constant force, rather than by a change in elastic configuration. A yielding medium is necessary in this case as well as in the preceding case, but the deformations of the yielding body are merely incidental and, by a proper design, can be made very small.

The matter may be viewed in another light: since fatigue is due to the large stress or strain range to which ordinary springs are subjected, it follows that it can be minimized or eliminated by sufficiently reducing the strain range. I obtain this reduction by the use of certain types of spring motion reducing mechanism in conjunction with initially strained springs, as will be explained. A spring motion reducing mechanism is one which converts a prescribed relative displacement of body and axle into a total spring strain smaller than said displacement. In the case of an ordinary vehicle spring, for example, a displacement of one inch of the axle relative to the body requires the spring to deflect one inch; but by the use of a spring motion reducing mechanism, said displacement requires a spring strain of only a fraction of an inch. Spring motion reducing mechanisms have been employed before, but without initial strain they are insufficient and practically useless. For it can readily be shown that when the springs undergo a reduced motion without being initially strained, the stiffness of the springs must be enormously increased in order to enable the suspension to carry the load. But this increase in stiffness means a proportionate increase in the stress range, so that whatever gain may result from reducing the spring strain is lost. Without initial strain, therefore, the analogy to the violin strings disappears.

When the springs are initially strained, however, and more particularly, when the initial strain is large in comparison with the subsequent strains produced by relative displacements of body and axle, the reduction in the spring strain is obtained without unduly increasing the spring stiffness, and a net reduction in the strain range is secured.

The exact meaning of the above will become more clear by reference to the accompanying drawings, in which—

Figure 1 shows diagrammatically a side elevation, and

Fig. 2 a plan of one embodiment of my invention;

Fig. 3 shows one of springs of Figs. 1 and 2 in its unstrained condition, and in its initially strained condition.

Fig. 4 shows diagrammatically a side elevation, and

Fig. 5 a plan of another embodiment of my invention.

Figure 6:
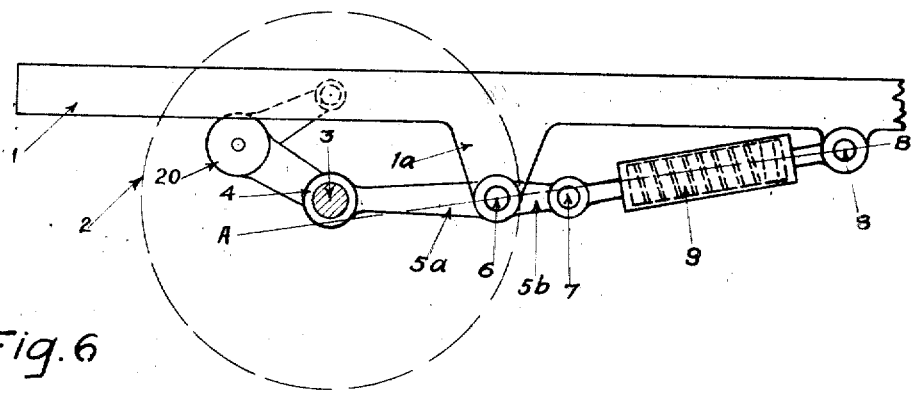
Figure 7:
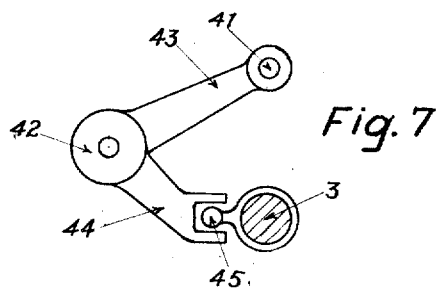

Fig. 6 shows diagrammatically a side elevation of still another embodiment;

Fig. 7 shows diagrammatically a type of frictional element.

Referring to Figs. 1 and 2, 1 represents a portion of the frame of a motor-vehicle.

The end of the frame shown is bent down to form a bracket, $1^a$ and another bracket, $1^b$, is rigidly fastened to the frame 1. For the sake of clearness the frame 1 is not shown in Fig. 2, and only the sections of the lower ends of the brackets $1^a$ and $1^b$ appear. 2 indicates the wheel, which is shown merely by a dotted circle in Fig. 1. To the axle 3 is rigidly fastened a collar 4, which collar is formed with the two arms, as shown.

Pivots 5 and 6 are carried by these arms, and the brackets $1^a$ and $1^b$ carry pivots 7 and 8 respectively. The vehicle body is supported by the elastic tension members 9 and 10, stretched between the pairs of pivots 5—7 and 6—8 respectively. These elastic tension members may be adjustable and may take a variety of forms; for example, they may be simple helical tension-springs. A preferred form of tension member is shown in Fig. 1, in which $9^a$ represents a cylindrical casing, $9^b$ the connection between this casing and the pivot 7, $9^c$ a piston sliding in the casing, $9^d$ the piston rod by means of which the piston is connected to the pivot 5, and $9^e$ a helical compression-spring. The tension member 10 is composed of similar parts. The parts $9^a$ to $9^e$ inclusive, comprise a tension member as a whole, that is, they introduce the requisite tensile force between the pivots 5 and 7; but the spring itself is under compression. 20 indicates a frictional element, the purpose of which and preferred forms of which will be hereinafter specified.

To simplify the figures the vehicle body is not shown in Figs. 1 and 2, but it is important to note that the suspension is shown in a deflected configuration corresponding to a loaded vehicle, either partly or fully loaded. A line A B is shown, drawn through the center of the pivots 7 and 8. As the body rises and falls, the line A B rises and falls with it. If some of the load is removed from the body, the frame rises a certain distance, depending on the load removed. This is accompanied by a rotation of the tension members 9 and 10 about the pivots 5 and 6 respectively, so as to decrease the angle between the tension members and the line A B, and by a decrease in the distance between line A B and the pivot-centers 5 and 6. If all of the load were removed, and if the remaining parts were weightless and frictionless, the suspension would assume the configuration in which all four pivots are on the straight line A B, $i.\ e.$, the one in which the tension members make zero angle with A B. We shall call this the no-load configuration. It is clear that in this configuration, the strain and the tensile force of the tension members are a minimum.

Although the suspension itself can sustain no load when in the no-load configuration, it is obvious that the springs thereof may be under as much strain as desired. This is the strain which I have called the initial strain. In other words, an initial strain is a strain imposed on the springs of the suspension before the suspension as such supports any weight whatever. This initial strain is also the minimum strain to which the springs are subject, as pointed out above.

Referring to Fig. 3, which serves to give the meaning of initial strain greater definiteness, 82 shows one of the springs of Fig. 1 in its normal or unstrained condition. This same spring, in its condition of initial strain under the no-load configuration, is shown at 81. The difference in the lengths of 81 and 82, which in Fig. 3 is designated as the distance 1, is the initial strain to which the spring is subjected.

It is to be noted that as the suspension passes from the deflected configuration of Fig. 1 to the no-load configuration, the decrease in the distance between the pivots 5 and 7 and between 6 and 8 is small, hence the increase in the length of the springs is small. Hence the spring as shown at 81 of Fig. 3, in its condition of initial strain, is but slightly longer than the same spring shown at $9^e$ of Fig. 1 in its condition of strain under load. From this it is clear that in the suspension illustrated in Figs. 1, 2 and 3 the additional strains produced in the springs by the motion of the body relative to the axle are small compared to the initial strain, and this is essential if the best results are to be obtained. Or, in other words, the tension of the tension members varies but little in any small motion of the body relative to the axle, in comparison with the initial tension, hence this spring system, when designed for best results, may be described as one of nearly constant tension. This is not to be construed, however, as meaning that my invention is limited to very large initial strains in comparison with the subsequent strains due to relative motion between body and axle, for even with moderate initial strains, my invention gives improved results. It is pointed out that large initial strains are necessary for best results.

The analogy to the violin string will now be clear. In the no-load configuration, the suspension acts as a string tightly stretched between the pivots 7 and 8, and exerts no vertical force. The deflection of the suspension due to load, which corresponds to pulling the string aside, produces vertical components of the forces due to the tension members while only slightly altering the tension of said tension members. Thus we obtain elastic forces by changes in the force components of a strained body, rather than by changes in the elastic configuration of that body.

The members 9 and 10 of Fig. 1 are tension members in the true sense, because they exert a tensile force between pivots 5 and 7 and between pivots 6 and 8 respectively. But owing to the fact that the springs are applied inversely, so to speak, this tensile force is produced by a compression of the spring itself; an elongation of the tension member therefore corresponds to a compression of the spring itself; and the initial strain on the spring is therefore a compressive strain, as shown in Fig. 3. But if simple tension springs were used instead of the arrangement shown at 9 and 10 in Figs. 1 and 2, an elongation of the tension member would correspond to an elongation of the spring, and in this case the initial strain in the spring would be a stretch instead of a compressive strain. The word tension as used in this connection herein refers to the force exerted by the tension members between their respective pivots, irrespective of the manner in which this tensile force is produced.

The linkage shown in Figs. 1 and 2 has been described herein as a spring-motion reducing mechanism, because, as is clear from the foregoing, a given displacement of the body from its equilibrium position results in a change in the length of the tension members, that is, in a spring-strain, which is small compared to said displacement, provided that the angles which the tension members make with line A B are not too large. The reduction ratio, in the sense used herein, is the ratio of the displacement of the body to the change in the length of the springs which said displacement produces. The reduction ratio may be more precisely defined as follows:

Suppose that the body carrying a certain load is resting in equilibrium on its suspension, and that the configuration of the suspension necessary to support the body in equilibrium under that load is that shown in Fig. 1; if the axle is now given a very small displacement $dy$, either up or down relative to the body, the length of the springs will be changed by an amount $dx$ smaller than $dy$; the reduction ratio is then defined as the ratio $dy : dx$. It is easily shown from the principles of mechanics that the reduction ratio thus defined is given by $$dy : dx = 1 : \sin q,$$

where $q$ is the angle which each tension member makes with the line A B; that is, the reduction ratio is inversely proportional to the sine of the angle between the tension-member and the line A B. As the load on the body is diminished the body rises and the angle $q$ diminishes, hence the reduction ratio becomes greater. It follows then that the lighter the load the greater the reduction ratio. In other words, the reduction ratio of this suspension is not constant, but varies inversely as the load.

In order to illustrate by a concrete example how my invention reduces the strain range and the stress range in the material of the springs, suppose that the initial strain is four inches and that a maximum fiber stress of 120,000 pounds per square inch in the spring material is caused thereby. Also, suppose that the greatest subsequent strain, which the maximum allowable displacement of axle relative to body causes, is one inch. Then the maximum subsequent strain will be only one-fourth of the initial strain, and the fiber stress variation in the material will be from 120,000 to 150,000 pounds per square inch, i. e., a maximum fiber stress range of 30,000 pounds per square inch. In ordinary vehicle springs, on the other hand, the fiber stress range is generally three to five or more times this amount.

It should be pointed out that even if the springs of my suspension should have their elasticity somewhat impaired by long continued service, the suspension as a whole would continue to act with approximate perfect elasticity. For since only a comparatively small component of the spring force acts on the body, so only a comparatively small component of any imperfectly elastic force which the springs themselves may exert will be felt by the body. This is one of the fundamental advantages of my suspension.

The form of my invention shown in Figs. 1 and 2 is capable of quite wide application. But when the wheel-center, in its motion relative to the body, is constrained to move in an arc of short radius, and particularly when that radius must be adjustable, (as in the case of motor-vehicles having the double side-chain drive), the form shown in Figs. 1 and 2 presents certain disadvantages. These disadvantages are overcome in the modification of my invention shown in Figs. 4 and 5, in which 1 is a portion of the vehicle frame, partly cut away in Fig. 5 in order to reveal the spring mechanism; 2 is a wheel, indicated merely by a dotted circle in Fig. 4; 3 is the axle, which appears in section in Fig. 4. To the under side of the frame are rigidly fastened the brackets 1ª, 1ᵇ, 1ᶜ and 1ᵈ. 1ª and 1ᵇ appear in section in Fig. 5, while 1ᶜ and 1ᵈ are not shown in Fig. 5. The pair of brackets 1ª and 1ᵇ carry the rod 11, and the pair 1ᶜ and 1ᵈ carry the rod 12. The rods 11 and 12 are in alinement. Sliding freely on rods 11 and 12 are the sliders 13 and 14, which carry the pivots 7 and 8 respectively. The collar 4 is rigidly fastened to the axle 3, and carries the pivots 5 and 6. Pivoted at 5 and 7 is the tension member 15, and pivoted at 6 and 8 is the tension member 16. These tension members are shown as frameworks, each made up of two rods rigidly connected together at or near their ends; this construction gives sidewise rigidity to the body of the vehicle. Spanning the rods 11 and 12 and sliding freely thereon is the yoke 19. Between the slider 13 and the yoke 19 is a long, heavy, helical compression spring 17, and likewise between 14 and 19 is the spring 18. 20 indicates a frictional element, the purpose of which and preferred forms of which will be hereinafter specified. 21 is the pivot of the radius rod which compels the wheel-center to move in the arc MN shown in Fig. 4. The radius rod is indicated by the dashed line R with arrowhead.

In order to exhibit the construction more clearly in Fig. 4, the bracket 1ᵈ and the yoke 19 are shown partly in section, the slider 14 and the spring 18 are shown wholly in section, most of the tension member 16 is cut away, and the pivot 8 is not shown.

It is clear from the foregoing that if the constraint of the radius rod R is removed, the wheel-center can move fore and aft parallel to the line A B as far as the limits of the mechanism permit. As the wheel-center moves parallel to A B it carries with it the spring suspension proper, that is, the tension members, sliders, springs and yoke. The radius rod may take any length compatible with these limits, and thus adjustment of the radius rod is allowed for. Furthermore, the motion of the wheel-center in the arc MN can be decomposed into two motions, one parallel to and one perpendicular to the line A B. The latter motion is taken care of by the spring suspension proper; the motion parallel to A B is taken care of by motion of the spring suspension as a whole parallel to A B, as described.

The line A B has the same significance as the line A B of Fig. 1. Just as in the case of Fig. 1, the suspension shown in Fig. 4 is under load. If all load were removed from the suspension, then in the theoretical case of a weightless, frictionless suspension the configuration would be assumed, in which all four pivots, 5, 6, 7 and 8 are in the line A B; that is, the no-load configuration. When the suspension is in this state, the springs can be under as much compression, that is, the tension members under as much tension, as desired. This compression and tension are the initial strain and the initial tension which have been fully described in connection with Figs. 1, 2 and 3. The unstrained length of the springs 17 and 18 of Figs. 4 and 5 are not shown, but it is to be understood that these springs are under an initial strain which is large in comparison with the additional strains caused by relative motions between body and axle; a condition which, as already noted, is essential for best results.

The remarks which have been made concerning the operation of the suspension shown in Figs. 1 and 2 are equally applicable to the suspension shown in Figs. 4 and 5. The only difference to be noted is that for a given angle between the tension members and the line A B, the reduction ratio of the suspension shown in Figs. 1 and 2 is slightly greater than that of the suspension shown in Figs. 4 and 5.

By rigidly fastening the yoke 19 to the rods 11 and 12, the suspension shown in Figs. 4 and 5 may be adapted for use on the front axle or on shaft driven motor vehicles.

The two embodiments of my invention which have so far been described have very similar spring-motion reducing mechanisms. In order to illustrate how widely the type of the reducing mechanism may be varied in my invention, I have shown in Fig. 6 a side elevation of another embodiment. In Fig. 6, 1 represents part of the frame of the vehicle, 2 indicates the circumference of the wheel, and 3 shows the axle (in section). 5ª—5ᵇ is a heavily built lever which is pivoted to the frame at 6. The pivot 6 is carried by the bracket 1ᵉ, which is part of the frame. 4 is a collar which is integral with the long lever-arm 5ª and which is rigidly fastened to the a.. 3. 7 is a pivot carried by the short lever arm 5ᵇ, and 8 is another pivot carried by the frame. Stretched between the pivots 7 and 8 is the tension member 9, similar in construction to the tension members 9 and 10 of Figs. 1 and 2. 20 is a frictional element, which will be more fully described hereinafter.

In Fig. 6, as in previous figures, the suspension is supposed to be under load. The line A B, drawn through the pivot centers 6 and 8, has the same significance as heretofore; viz., when the three-pivot-centers 6, 7 and 8 are all on the line A B the suspension can sustain no load and is therefore in the no-load configuration. But with the suspension in the no-load configuration the spring thereof can sustain an initial strain as large as desired, and it is to be understood that such an initial strain is imposed, which should be large in comparison with the subsequent strains to which the spring is subjected for best results. It is clear from the figure that a given motion of the wheel-center relative to the body produces a relatively small deformation of the spring, hence this suspension like those previously described herein, has for its fundamental elements, a spring-motion reducing mechanism of decreasing reduction-ratio with increasing load and an initially strained spring system coöperating therewith.

The analogy between the suspension of Fig. 6 and the violin string may be pointed out. In equilibrium, the moment about pivot 6 due to the upward reaction of the axle is equal to the moment of the tension member 9 about the same axis. The latter moment is equal to the product of the distance between pivot-centers 6—7 multiplied by the component of the tension member perpendicular to the line drawn through the pivot-centers 6—7. Hence the supporting component of the tension member is its component perpendicular to the line through pivot-centers 6—7. When the pivot-centers 6, 7, 8 all lie on the line A B, this supporting component is evidently zero, hence the suspension can exert no supporting force and is therefor in the no-load configuration. This corresponds to the stretched violin string in its normal position. As load comes on the suspension, the angle between the tension member and the line 6—7 increases from zero, and the tension member therefore acquires a component perpendicular to the line 6—7, i. e., a supporting component, which is proportional to the load; and this is accomplished without materially altering the tension of the tension member, provided that the spring thereof has sufficient initial strain. The introduction of a supporting component in this manner is clearly analogous to pulling the stretched string aside. Hence the suspension of Fig. 6, like those described above, depends on changes in the supporting component of a nearly constant force with only incidental changes in elastic configuration, rather than on changes of elastic configuration alone.

The vehicle suspensions which have been described are each shown equipped with a frictional element designated as 20. In order to completely understand the function which these frictional elements have to perform, it is necessary to distinguish between two types of oscillations which a suspended system, like a vehicle body, can perform. Suppose a weight hung from a fixed point by a spring is displaced vertically from its equilibrium position and then released; the weight will then undergo oscillations of decreasing amplitude until it finally comes to rest. These are the free oscillations of the weight. But if the point of support, instead of being fixed, is made to undergo simple harmonic motion, the weight will ultimately settle down to a state of simple harmonic motion also, that is, the weight will follow the motion of its point of support to a greater or less extent. These are the forced oscillations of the weight. The body of a vehicle in motion may be regarded as a weight hung by a spring from a support (viz., the axles), which is undergoing a combination of a great variety of simple harmonic motions. A vehicle body, then, is capable of performing both free and forced oscillations. When the amplitude is small, the free oscillations are not particularly objectionable. But free oscillations of large amplitude and forced oscillations of any but very small amplitude are highly objectionable, and it is the object of every vehicle suspension to eliminate them as far as possible. In order to prevent the free oscillations from attaining a large amplitude, energy-dissipating forces of some kind, that is, frictional forces of some kind must be introduced between the body and the axles. But such forces, by decreasing the freedom of relative motion between the body and axles, always tend to increase the forced vibrations. It is the function of the frictional element, therefore, to keep the amplitude of free oscillations within suitable limits without causing a notable increase in the forced oscillations.

A frictional element which, if properly constructed and adjusted, will perform this function fairly satisfactorily, is shown in Fig. 7. Here 42 is a pair of pivoted sliding frictional surfaces, one disk of which carries the arm 43 and the other the arm 44. The arm 43 is pivoted to the frame of the vehicle at 41. The free end of the arm 44 is forked as shown. 3 is the axle which carries the pin 45. Owing to the fork-and-pin arrangement, the frictional element is not called into play until the amplitude of the motion of the axle relative to the body exceeds a certain value, hence this frictional element will have no effect on the forced vibrations so long as the axle motions are small, and, if properly adjusted, will keep the free oscillations within required limits.

The frictional element described is not the only one which may be used in my invention. There are certain types of frictional "shock-absorbers" on the market at the present time which would operate satisfactorily, especially on slow moving vehicles, such as motor trucks. Furthermore, in many cases there may be enough friction in the pivots and other parts of the suspension to render additional friction unnecessary. The form shown in Fig. 7 merely illustrates a preferred type of frictional element, and my invention is not to be regarded as limited to the use therein of any particular means of limiting or entirely eliminating the free oscillations. It should be pointed out, however, that the ability to minimize the friction in the suspension itself and to reintroduce the friction in a controlled manner is one of the advantages of my invention.

The term "strain" is used herein in its usual sense to denote change of shape or deformation. When applied to a helical spring it means elongation or compression; to an elliptic spring it means deflection; and so forth, for the different types of springs which may be employed. The term "stress" is used in its usual sense to denote the force associated with the strain. The term "spring-motion reducing mechanism" is used herein to denote any linkage or other mechanism which converts a prescribed motion—the relative displacement of body and axle—into a resulting smaller motion—the compression or elongation or deflection of the spring or springs. My invention, however, does not include all reducing mechanisms; it includes only those in which the reduction ratio varies inversely as the load.

It is to be understood that such expressions as "normal range of relative displacements of body and axle" and "normal relative displacements of body and axle", etc., refer to displacements due to load carried by the vehicle, plus those due to passing over ordinary road irregularities. Extreme displacements, such as are due to large irregularities in the road, may be included, but are not necessarily included.

The term "nearly constant strain", as used herein, is intended to include strain variations which, in themselves, may not be very small, but which are small in comparison with the strain variations to which ordinary vehicle springs are subjected. A similar latitude of definition should be allowed to the terms "nearly constant stress," etc.

I am aware that suspensions superficially similar to mine have been devised, but so far as I know I am the first to discover the real importance of spring fatigue and to minimize it and its effects on the bodies of vehicles; I am the first to employ initially strained springs under nearly constant strain throughout the normal range of relative displacement of body and axle, and to obtain elastic forces by changes in the supporting components of springs rather than by deformation of springs; and I am the first to reduce the stress and strain range in vehicle springs by employing reducing mechanisms of reduction ratio varying inversely as the load, in conjunction with initially strained springs. These are the broad aspects of my inventions, which is not to be construed as limited to the specific embodiments described herein.

The terms "spring" and "springs" as used in the specification and claims are intended to include metal or solid springs or some suitable equivalent other than fluid springs.

What I claim is:

1. In a vehicle suspension, the combination of an initially strained spring and a spring-motion reducing mechanism of reduction ratio varying inversely as the load, whereby the spring material is subjected to reduced stress variations.

2. In a vehicle suspension, the combination of an initially strained spring, the initial strain whereof is large in comparison with the subsequent strains due to normal relative displacements of body and axle, and a spring-motion reducing mechanism of reduction ratio varying inversely as the load, whereby the spring material is subjected to reduced stress variations.

3. In a vehicle suspension, the combination of a plurality of initially strained springs, and a spring-motion reducing mechanism of reduction ratio varying inversely as the load, whereby the spring material is subjected to reduced stress variations.

4. In a vehicle suspension, the combination of a plurality of initially strained springs, the initial strains whereof are large in comparison with the subsequent strains due to normal relative displacements of body and axle, and a spring-motion reducing mechanism of reduction ratio varying inversely as the load, whereby the spring material is subjected to reduced stress variations.

5. In a vehicle suspension, an initially strained spring under nearly constant strain throughout the normal range of relative displacements of body and axle.

6. In a vehicle suspension, the combination with a pair of pivots, one fastened to the body and the other fastened to the axle, of a tension member extending between the pivots and being under nearly constant tension throughout the normal range of relative displacements of body and axle.

7. In a vehicle suspension, the combination with a plurality of pivot pairs, one pivot of each pair being carried by the body and the other by the axle, of a plurality of tension members under nearly constant tension throughout the normal range of relative displacements of body and axle, each tension member extending between a pivot pair.

8. In a vehicle suspension, the combination with a pair of pivots, one fastened to the body and the other fastened to the axle, of a tension member extending between the pivots, and an initially strained spring adapted to maintain said tension member under nearly constant tension throughout the normal range of relative displacements of body and axle.

9. In a vehicle suspension, the combination with a plurality of pivot pairs, one pivot of each pair being carried by the body and the other by the axle, of a plurality of tension members each extending between a pivot pair, and a system of initially strained springs adapted to maintain said tension members under a nearly constant tension throughout the normal range of relative displacements of body and axle.

10. In a vehicle suspension, the combination of a tension member, and an initially strained spring forming a part of said tension member and adapted to maintain said tension member under nearly constant tension throughout the normal range of relative displacements of body and axle.

11. In a vehicle suspension, the combination of an initially strained spring, and an angularly movable member co-acting therewith in supporting the body and adapted to reduce the subsequent strains produced in said spring by normal relative displacements of body and axle.

12. In a vehicle suspension, the combination of a system of initially strained springs, and a plurality of angularly movable members co-acting therewith in supporting the body and adapted to reduce the subsequent strains produced in the springs by normal relative displacements of body and axle.

13. In a vehicle suspension, a pair of spring tension members under nearly constant strain, each pivoted to both body and axle and arranged for bodily angular motion upon displacement of either or both of said parts from equilibrium.

14. In a vehicle suspension, a pair of initially strained elastic tension members each pivoted to both body and axle and arranged for bodily angular motion upon displacement of either or both of said parts from equilibrium.

15. In a vehicle suspension, the combination with an axle and a frame of a pair of pivots rigid with the axle, a second pair of pivots depending from the frame at opposite sides of and below the axle pivots, and a pair of initially strained elastic tension members each stretched between an axle pivot and a frame pivot and adapted to support the frame on the axle.

16. A vehicle suspension comprising, initially strained springs, a spring-motion reducing mechanism of reduction ratio varying inversely as the load coöperating therewith for reducing the subsequent strains produced in said springs in comparison with the relative displacements of body and axle causing said subsequent strains, and frictional means for checking the free oscillations of the suspended body.

17. A vehicle suspension comprising, initially strained springs, means coöperating therewith for reducing the subsequent strains produced in said springs in comparison with the relative displacements of body and axle causing said subsequent strains, the reduction ratio of said means varying inversely as the load, and frictional means operative to check the free oscillations of the suspended body when they exceed a predetermined amplitude.

18. The method of reducing stress variations in the material of spring suspensions, which consists in initially straining the spring or springs of the suspension and in subjecting said spring or springs to reduced subsequent strains by means of a spring-motion reducing mechanism of reduction ratio varying inversely as the load.

19. The method of supporting a vehicle body upon its axles by means of a spring suspension, which consists in initially straining the spring or springs of the suspension, and in altering the supporting components of the forces due to said spring or springs, upon application of load, without materially altering the elastic configuration of the spring or springs.

20. The method of supporting a vehicle body upon its axles by means of a spring suspension, which consists in subjecting the spring or springs of the suspension to an initial strain which is greater than the subsequent strains due to normal relative displacements of body and axle, and in altering the supporting components of the forces due to said spring or springs, upon application of load.

In testimony whereof I have hereunto affixed my signature in the presence of two subscribing witnesses.

BENJAMIN LIEBOWITZ.

Witnesses:
LESTER F. DITTENHOEFER,
GRACE M. RIVIERE.